United States Patent Office

3,702,763
HIGH TEMPERATURE BRAZING ALLOY
Nicholas T. Gamer, Palo Alto, and James G. Richardson, Menlo Park, Calif., assignors to Western Gold & Platinum Company
No Drawing. Filed Apr. 19, 1971, Ser. No. 135,493
Int. Cl. C22c 5/00
U.S. Cl. 75—173 R                                   6 Claims

ABSTRACT OF THE DISCLOSURE

A high temperature alloy for brazing high strength lightweight titanium base alloy systems and the like consists, in percent by weight, of 1–20% palladium, 3 to 10% gallium, and the balance silver. A preferred composition of the brazing alloy is 7–15% palladium, 5–9% gallium and the balance silver.

BACKGROUND OF THE INVENTION

This invention relates to high temperature brazing alloys and in particular to an alloy useful in brazing high strength high performance base alloy systems. One such alloy system is titanium-6 aluminum-4 vanadium, hereinafter referred to in abbreviated form as Ti-6Al-4V, composed, in percent by weight, of 6% aluminum, 4% vanadium and the balance titanium.

Ti-6Al-4V is an alloy that is widely used in the aircraft industry for structural components and external covering of high performance aircraft because its strength-to-weight ratio and resistance to oxidation and corrosion are high and because it can withstand high temperatures. Alloys used in brazing Ti-6Al-4V must have similar characteristics and also must have a sufficiently low brazing temperature to preserve these properties of the base metal.

A brazing alloy which meets these requirements except for the brazing temperature is composed, in percent by weight, of 10% palladium and 90% silver. This alloy has a brazing temperature of approximately 985° C. When Ti-6Al-4V is heated to a temperature of 980–1005° C., however, it undergoes a transition from an alpha phase to a beta phase. Thereafter, upon cooling, the base metal no longer has the grain structure and attendant desirable characteristics it had before brazing. Also, at temperatures above this beta transition level or transus, the silver in the palladium-silver brazing alloy tends to diffuse excessively into the body of the base alloy and thereby lowers its corrosion resistance. It is therefore important that the brazing alloy have a brazing temperature no greater than this critical value and preferably substantially below it.

Due to the vagaries of temperature and materials control, it is desirable to use a brazing filler metal whose flow temperature is well below the beta transus. In order to reduce the brazing temperature of this silver-palladium alloy well below the beta transus of Ti-6Al-4V, an element or metal having a sufficiently low melting temperature is added in the proper quantity to the brazing alloy composition. The addition of such a temperature depressant to the brazing alloy, however, also affects other properties of the brazed joint such as its strength, ductility, flash and voids so that the total effect of the temperature depressant element must be considered.

A general object of this invention is the provision of a brazing alloy with a brazing temperature well below the beta transition temperature of the base alloy.

Another object is the provision of such a brazing alloy which is characterized by high strength and ductility and minimum voids.

A further object is the provision of such a brazing alloy which has minimum reaction with the base metal.

We have discovered that the addition of gallium to the basic silver-palladium brazing alloy produces a brazed joint that meets the foregoing criteria and objects. More specifically, we have found that a brazing alloy consisting in percent by weight, of 3–10% gallium, 1–20% palladium and the balance silver achieves an excellent bond for Ti-6Al-4V and that, within this range, a preferred brazing alloy consists, in percent by weight, of 5–9% gallium, 7–15% palladium and the balance silver.

A brazing alloy embodying this invention is prepared by placing the palladium, silver and gallium in the prescribed proportions in a crucible, melting and casting into ingots which are cold-worked into useful forms such as wire or sheet.

TABLE I

| Alloy number | Percent by weight | Temperatures in degrees centigrade, brazing (approx.) |
|---|---|---|
| 1 | 90 Ag, 10 Pd | 1,065 |
| 2 | 87 Ag, 10 Pd, 3 Ga | 960 |
| 3 | 82 Ag, 9 Pd, 9 Ga | 890 |
| 4 | 86.5 Ag, 8.5 Pd, 5 Ga | 940 |
| 5 | 95 Ag, 1 Pd, 4 Ga | 930 |
| 6 | 77.5 Ag, 14 Pd, 8.5 Ga | 940 |

The brazing temperatures of the basic palladium-silver brazing alloy and of alloys embodying this invention are shown in Table I for comparison purposes. The beta transition temperature for Ti-6Al-4V is approximately 980° C. and so Alloy 1 is deficient for brazing purposes because its brazing temperature exceeds the beta transus so that its use results in a degrading transformation of the base alloy. On the other hand, Alloys 2 and 6 braze at temperatures well below the critical transition level and therefore do not produce such transformation of the base alloy. Palladium has a melting point of 1552° C. and accordingly reduction of the proportion of palladium results in a depression of its brazing temperature so that less gallium is needed. Such reduction of palladium, however, also lowers resistance of the brazed joint to corrosion; for this reason, alloys with less than 1% by weight of palladium are not generally suitable for the more severe corrosive environments which Ti-6Al-4V is capable of withstanding. For this minimum proportion of palladium, 3–4% gallium (Alloy 5) operates satisfactorily in reducing the brazing temperature of the alloy. The approximate brazing temperature for alloys with 3%, 9%, 5%, 4% and 8.5% gallium are shown for Alloys 2, 3, 4, 5 and 6, respectively, in Table I.

An increase in the proportion of gallium in the brazing alloy is limited, inter alia, by the tendency of this metal to segregate in grain boundaries of the brazing alloy and thereby weaken it. While this condition may be remedied by subsequent heat treating, costs of the process are thereby increased. We have found that as much as 10% gallium in the alloy may be used in successfully brazing Ti-6Al-4V and that a 6% gallium proportion has been observed to remain homogeneous.

In order to test and evaluate the effectiveness and characteristics of a brazing alloy embodying this invention, a T-joint of Ti-6Al-4V was prepared by acid stripping this base alloy, and thereafter a 3–10 mil (.003"–.010") shim of the brazing alloy was preplaced in approximately half of the joint in order that liquation could be observed. The test conditions included brazing in a vacuum chamber pumped to $10^{-5}$ torr, heating slowly to approximately 600° C., and thereafter backfilling with an inert gas, such as a partial atmosphere of helium, while quickly heating to the brazing temperature (930–940° C. for Alloy 2).

These joints were held at the brazing temperature for approximately two minutes and thereafter were cooled at a modest rate of approximately 50° C. per minute.

T-joints brazed with Alloys 1 and 2 were tested and evaluated on the basis of strength and ductility, metallographic character and appearance.

(a) Joint ductility and strength: Strips of .050 inch thick Ti-6Al-4V were brazed together in a T-configuration using Alloys 1 and 2 such that the leg strip abutted the top strip, the latter was clamped in a vise and the leg strip was hammered through a 90° bend relative to the top strip. The strength was qualitatively assessed by the number and severity of blows to produce failure. Ductility was evaluated by the ability of the fillet to resist cracking.

Alloy 1 exhibited good strength and excellent ductility. The fillet held together through each 90° bending arc. Failure of the joint occurred along the brazing alloy in the fillet of the side where tensile stress was applied.

Alloy 2 likewise exhibited excellent strength and ductility by holding through a full 90° bending arc. As with Alloy 1, the failure occurred along the brazing alloy.

(b) Metallography of the brazed joint: Alloy 1 was observed to be practically free of voids both on the surface and internally. The Ti-6Al-4V, however, was transformed to the beta phase during the brazing operation. In the region of the brazing alloy placement, there was a wide reaction zone which did not appear in the liquated part of the joint. It is believed that this resulted from the higher temperature and the higher solubility of the silver in the beta phase.

Alloy 2 produced a single phase structure in the braze metal and the base metal, Ti-6Al-4V, did not undergo any transformation from the alpha to the beta phase. The diffusion zone, i.e., the zone in which the brazing alloy permeates the base alloy, was barely detectable. There were few surface voids, although slightly more than in the Alloy 1 joint.

(c) Appearance (visual) of fillet: Alloy 1 exhibited an excellent fillet both in shape and texture. The alloy flowed rapidly and evenly at brazing temperature. The joint also had moderate "flash," i.e., the undesirable tendency for silver, in particular, to creep over the surface of the titanium alloy away from the joint.

Alloy 2 also exhibited an excellent fillet in terms of shape and texture though to a lesser degree than with Alloy 1. This alloy also had good flow characteristics and moderate "flash" although to a lesser degree than Alloy 1.

The results of the braze evaluation of Alloys 1 and 2 are summarized in Table II in which "1" represents the highest rating and "6" the poorest rating.

TABLE II

| Characteristic | Alloy 1, 90 Ag, 10 Pd | Alloy 2, 87 Ag, 10 Pd, 3 Ga |
|---|---|---|
| Brazing temperature | 6 | 2 |
| Visual appearance | 1 | 2 |
| Micrographic appearance | 2 | 1 |
| Voids | 2 | 3 |
| Strength | 2 | 3 |
| Ductility | 1 | 2 |
| Flash | 5 | 3 |

What is claimed is:

1. An alloy for brazing consisting essentially of 3–10% gallium, 1–20% palladium and the balance silver.
2. An alloy for brazing consisting essentially of 5–9% gallium, 7–15% palladium and the balance silver.
3. An alloy for brazing consisting essentially of 3% gallium, 10% palladium and the balance silver.
4. An alloy for brazing consisting essentially of 9% gallium, 9% palladium and the balance silver.
5. An alloy for brazing consisting essentially of 5–9% gallium, 1–20% palladium and the balance silver.
6. An alloy for brazing consisting essentially of 3–10% gallium, 7–15% palladium and the balance silver.

References Cited

UNITED STATES PATENTS

| 3,134,671 | 5/1964 | Prosen | 75—172 |
| 3,159,481 | 12/1964 | Horrigan et al. | 75—173 R |

FOREIGN PATENTS

| 573,176 | 11/1945 | Great Britain | 75—173 R |
| 1,023,708 | 3/1953 | France | 75—173 R |
| 1,180,224 | 10/1964 | Germany | 75—173 R |
| 1,044,379 | 9/1966 | Great Britain | 75—173 R |

L. DEWAYNE RUTLEDGE, Primary Examiner

E. L. WEISE, Assistant Examiner

U.S. Cl. X.R.

75—134 T, 172